United States Statutory Invention Registration [19]

[11] Reg. Number: H712

Hartman [43] Published: Nov. 7, 1989

[54] METHOD OF STELLAR NAVIGATION USING AN OPTICAL CORRELATOR

[75] Inventor: Richard L. Hartman, Huntsville, Ala.

[73] Assignee: The United States of America as represented by the Secretary of the Army, Washington, D.C.

[21] Appl. No.: 227,563

[22] Filed: Aug. 3, 1988

[51] Int. Cl.[4] ..... G01B 11/00; G01J 1/20

[52] U.S. Cl. ..... 364/456; 356/388; 250/203 R

*Primary Examiner*—Thomas H. Tarcza
*Assistant Examiner*—Linda J. Wallace
*Attorney, Agent, or Firm*—Freddie M. Bush; James T. Deaton

[57] ABSTRACT

A method of easily detecting a predetermined star pattern by directing imaging means in the general direction of the pattern desired to be detected and imaging the star pattern onto a matched filter of a correlator to produce and output that is used to signal a computer to enable the computer to calculate the location of the predetermined star pattern in the field of view.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF STELLAR NAVIGATION USING AN OPTICAL CORRELATOR

DEDICATORY CLAUSE

The invention described herein may be manufactured, used, or licensed by or for the Government for Governmental purposes without the payment to me of any royalties thereon.

BACKGROUND OF THE INVENTION

In the past, stellar navigation or position location has been performed by measuring the angular attitude of certain stars, and performing well known spherical geometry calculations to get latitude. Longitude has been determined in a more complex way by using an accurate time base. In prior art applications, the sextant has been used by navigators and a transit theodolite has been used by surveyors. Both of these instruments require an operator skilled both in operation of the instrument and in locating specific stars. Certain systems have also been built which provide automatic stellar navigation, but these require a highly accurate and expensive inertial navigation system in order to point star trackers at the pertinent stars. The advent of satellite navigation is beginning to start to provide a means of having a machine which automatically provides location. However, such machines are expensive and depend on the continuing function of a number of satellites. Therefore, a need exists for a device that is inexpensive yet has the capability of locating a particular position relative to stellar navigation.

Therefore, it is an object of this invention to provide a method of stellar navigation which utilizes an optical correlator to recognize a particular sky pattern.

Another object of this invention is to provide a method of stellar navigation which utilizes an optical correlator in conjunction with a computer in order to locate a particular position without the requirement of a highly skilled operator.

Other objects and advantages of this invention will be obvious to those skilled in this art.

SUMMARY OF THE INVENTION

In accordance with this invention, a method of stellar navigation is provided in which an optical correlator is used to recognize a particular sky pattern and the output of the correlator is utilized in a detector and computer to provide a digital computation which allows one to provide a particular location of position without requiring a highly skilled operator who knows stars.

DETAILED DESCRIPTION OF THE DRAWING

Figure 1:
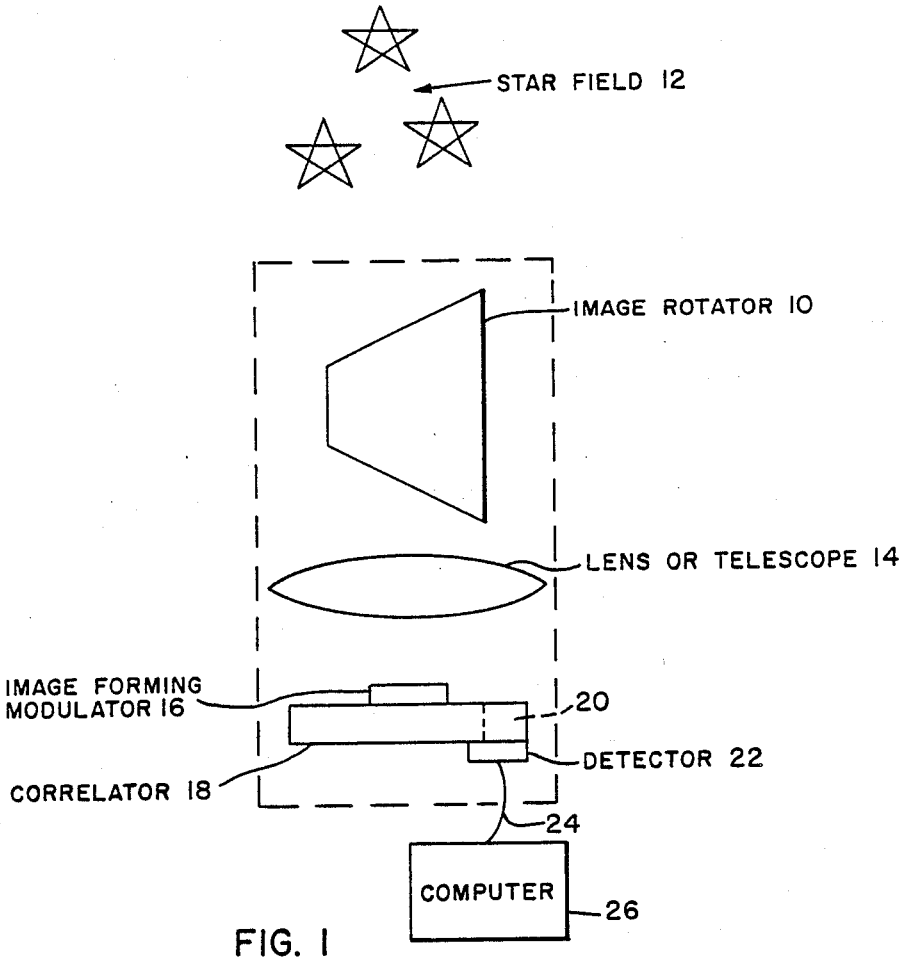
Figure 2:
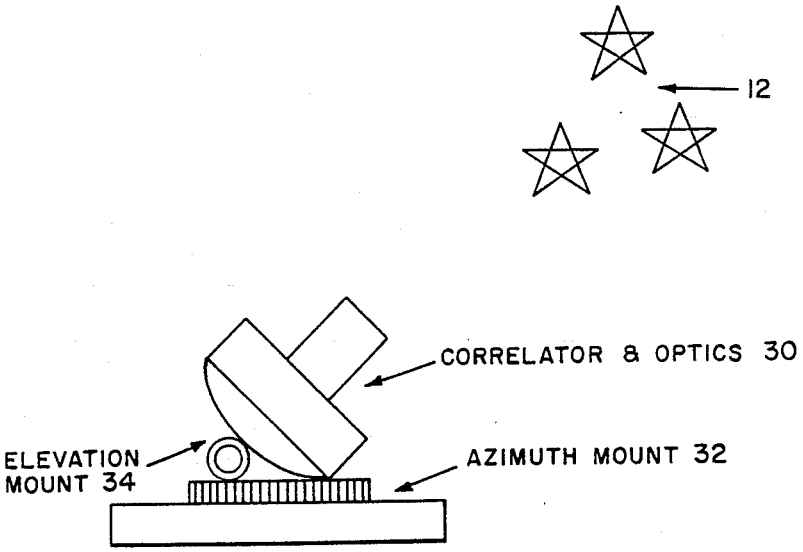

FIG. 1 is a schematic illustration of a system that illustrates the method used in carrying out the stellar navigation in accordance with this invention, and FIG. 2 is another embodiment illustrating using azimuth and elevation mounts.

DESCRIPTION OF THE PREFERRED EMBODIMENT

An optical correlator is a device which recognizes patterns. While an expensive and complex piece of laboratory equipment until recently, a solid block correlator has now been developed which holds the promise of making optical correlators relatively inexpensive. The advantage of the optical correlator is that it can recognize a predetermined star pattern so that there is no need to have a highly trained operator or an accurate inertial platform to point the star tracker.

There is a trade off between accuracy and field of view. In practice, applicant's correlator works well at locating an object to 1/200 of the field of view, and is upgradable to about 1/1,000 of the field of view. Thus, a correlator navigator designed to look completely dumbly at the sky, and needing to cover a full hemisphere, may provide only about thirty miles of accuracy. A narrow field of view optical system, which has to point in roughly the right direction, say with a compass, and knowledge of what country you are in, can give one mile accuracy. A more complex system which uses a moderate view to drive a telescope to look in the right direction with a very narrow field of view, can approach the fundamental accuracy of stellar navigation, a matter of a few meters. Applicant's automatic system has the advantage that it can integrate over a period of time, and thus out perform a human operator.

Referring now to FIG. 1, an optical system used in carrying out the method of this invention includes an image rotator 10 such as a dove prism for directing the image of predetermined stars 12 to a lens or telescope 14 which focuses the image from stars 12 onto input image forming modulator 16 of solid block optical correlator 18 which has a Holographic Fourier Transform matched filter 20 with the predetermined star pattern desired to be detected. Any output produced by matched filter 20 is projected onto quadrant type detector 22 and detector 22 communicates by cable 24 with a computer 26 such as a mini-computer to communicate the position of the output from matched filter 20 relative to the particular quadrants of detector 22. Also, the particular position of image rotator 10 is communicated to computer 26 to indicate the particular vertical and horizontal positions that image rotator 10 is positioned in to pick up the desired star field. Computer 26 is then preprogrammed to take these readings and produce the output or outputs desired relative to altitude and latitude. If longitude is desired, additional input of a clock reading is required.

In operation, the optical system, as depicted in the dashed in lines of FIG. 1 and absent the star field and computer 26, is leveled as a unit with leveling bubbles or by reference to an artificial horizon. The optical system is then illuminated by star field 12. If the relative rotation of star field 12 about the polar star matches that of matched filter 20, a correlation output will be produced by correlator 18. If correlator 18 does not produce an output, image rotator 10 must be adjusted until the star field is caused to be presented to lens 14 and optical correlator 18 so as to produce a correlation output. That is, image rotator 10 is adjusted until a correlation signal appears at the output. Also, this correlation signal is caused to be maximized by additional fine adjusting of image rotator 10. The location of the correlation point or output relative to the various quadrants of detector 22 are a measure of the altitude of star field 12. The output from detector 22 when communicated to computer 26 enables the altitude to be computed. Also, the altitude value of the correlation when fed into the computer yields latitude due to the preprogramming of computer 26 to perform the spherical trigonometry calculations required.

The rotation of the star field is compared with a clock not shown to get longitude. That is, the specific time on an accurate clock. The critical factor here is usually time measurement. Good digital watch technology is sufficient to locate within a fraction of a mile, while super precise measurements with a narrow field of view require linkage to a precise time source such as that broadcast over broadcasting station WWV.

It may be possible for one to build an optical correlator which has rotation invariance, through the use of circular harmonic or other techniques. However, this approach would eliminate the ability to measure longitude.

Referring to FIG. 2, a more sophisticated stellar navigation system is illustrated that includes star pattern 12 as depicted in FIG. 1 with the correlator and its optics 30 mounted on an azimuth mount 32 and an elevation mount 34. In this embodiment, a computer such as a minicomputer is programmed to drive rotors of the azimuth and elevation mounts to drive them into the position in which the star field 12 is in correlation with that of a matched filter of correlator 30. Once a correlation is produced, the computer continues to drive the rotors for the azimuth and elevation mounts in sidereal time so as to maintain the correlation. The azimuth and elevation mounts of the correlator and its optics 30 continue to be driven by control from the computer to move the correlation spot to the center of the field of view. With the correlation spot being produced from the matched filter of correlator 30, magnification of the optics can be increased and the star field compared to the matched filter of the magnified field. This comparison results in a more accurate measurement. Alternately, simple lights can be used to guide an operator in turning cranks for the azimuth and elevation mount until the narrow field of view is pointed in the right direction. The correlator of FIG. 2 is the same as that for FIG. 1 and is connected to a mini-computer in a similar manner to that illustrated in FIG. 1.

If desired, a narrow field of view can be created by adding lenses, using a zoom lens, by having a second correlator in parallel, or by having a complex lens with a narrow field of view in the center and a wide field of view around the edge. A correlator can be made to handle two or more fields of view by merely switching matched filters or by having two filters multiplexed into the same location by multiple exposure holography.

It is also pointed out that a more precise measurement of longitude can be made by having the computer calculate the approximate azimuth, elevation, and rotation for a narrow field of view portion of the star field far away from the polar star and by driving the correlator to look in that direction.

In any of the continuous motor drive options as set forth above, this invention provides the advantage of continuous measurement of the angles involved and leading to accuracy improvement by time averaging, or other accuracy improving algorithms such as Kalman filtering.

I claim:

1. A method of stellar navigation comprising, providing means for imaging a predetermined star pattern onto lens focusing means, directing the focused image to an image forming modulator of a correlator to cause an output to be produced from a matched filter of the correlator, utilizing the output from the correlator as control signals to a computer and utilizing the control signals in the computer with the position of the imaging means to cause the computer to calculate altitude the latitude.

2. A method of stellar navigation set forth in claim 1, wherein said image on the lens focusing means.

3. A method of stellar navigation as set forth in claim 1, wherein said imaging means is adjusted by azimuth and elevation mount means to orient the imaging means relative to the pattern desired to be detected.

* * * * *